US012728612B1

(12) United States Patent
Brown

(10) Patent No.: US 12,728,612 B1
(45) Date of Patent: Sep. 8, 2026

(54) PAPERBOARD PRESSING TOOL

(71) Applicant: BROWN LLC, Beaverton, MI (US)

(72) Inventor: Steffen Brown, Beaverton, MI (US)

(73) Assignee: BROWN LLC, Beaverton, MI (US)

( * ) Notice: Subject to any disclaimer, the term of this patent is extended or adjusted under 35 U.S.C. 154(b) by 0 days.

(21) Appl. No.: 19/175,421

(22) Filed: Apr. 10, 2025

(51) Int. Cl.
*B31B 50/59* (2017.01)
*B31B 110/20* (2017.01)

(52) U.S. Cl.
CPC ........... *B31B 50/59* (2017.08); *B31B 2110/20* (2017.08)

(58) Field of Classification Search
CPC ......... B65B 47/00; B65B 47/06; B65B 47/04; B31B 50/59; B31B 50/142; B31B 50/592; B31B 50/20; B31F 1/0009
See application file for complete search history.

(56) References Cited

U.S. PATENT DOCUMENTS

| | | | | | |
|---|---|---|---|---|---|
| 4,228,121 | A * | 10/1980 | Meadors | B29C 51/082 | 264/296 |
| 4,832,676 | A * | 5/1989 | Johns | B31F 1/0077 | 493/902 |
| 9,056,420 | B2 * | 6/2015 | Lee | B29C 51/04 | |
| 9,757,886 | B2 | 9/2017 | Middleton et al. | | |
| 9,808,117 | B2 | 11/2017 | Wnek et al. | | |
| 10,703,064 | B2 * | 7/2020 | Vassa | B31B 50/142 | |
| 2005/0192171 | A1 | 9/2005 | Grischenko et al. | | |
| 2007/0221625 | A1 * | 9/2007 | Kitajima | B31D 5/02 | 217/5 |
| 2007/0262487 | A1 * | 11/2007 | O'Hagan | B65D 1/26 | 264/241 |
| 2009/0232926 | A1 * | 9/2009 | Sofronie | B29C 43/36 | 425/394 |
| 2010/0264202 | A1 * | 10/2010 | Littlejohn | B65D 1/34 | 229/406 |
| 2010/0314801 | A1 * | 12/2010 | O'Hagan | B29C 45/1418 | 425/112 |
| 2016/0176145 | A1 * | 6/2016 | Vassa | B31B 50/592 | 493/338 |
| 2016/0176147 | A1 | 6/2016 | Vassa et al. | | |
| 2020/0231325 | A1 * | 7/2020 | Tibbets | B31B 50/592 | |

* cited by examiner

*Primary Examiner* — Andrew M Tecco
*Assistant Examiner* — Nicholas E Igbokwe
(74) *Attorney, Agent, or Firm* — HOVEY WILLIAMS LLP

(57) ABSTRACT

A multistage press machine for applying pressure to a blank to form a part comprises an upper plate assembly, a lower plate assembly, a top tool, and a bottom tool. The upper plate assembly couples to a system which lowers and raises the upper plate assembly. The lower plate assembly couples to the system to raise and lower the lower plate assembly. The top tool is attached to the upper plate assembly and configured to form a plurality of upper features in an upper surface of the blank, wherein each upper feature is formed in a respective one of a plurality of stages of a press operation. The bottom tool is attached to the lower plate assembly and configured to form a plurality of lower features in a lower surface of the blank, wherein each lower feature is formed in a respective one of the stages of the press operation.

10 Claims, 7 Drawing Sheets

TOP VIEW

BOTTOM VIEW

PAPERBOARD PRESSING TOOL

FIELD OF THE INVENTION

Embodiments of the current invention relate to machines configured to press paperboard blanks into shaped parts or products.

BACKGROUND OF THE INVENTION

Press machines typically include a top tool and a bottom tool, wherein the top tool is positioned above, and spaced apart from, the bottom tool. A blank is positioned between the two tools, and the top tool and the bottom tool are brought together to apply pressure to the blank to form or shape the blank into a product (or part of a product). The top tool presses features into an upper surface of the blank, and the bottom tool press features into a lower surface of the blank. Often, the top tool and the bottom tool are configured to form all of the features at roughly the same time. However, when the features are complex, detailed, or at different elevations, problems in pressing may arise. For example, some features may not be formed while others may may be damaged as a result of over pressing—leading to low product yield.

The background discussion is intended to provide information related to the present invention which is not necessarily prior art.

SUMMARY OF THE INVENTION

Embodiments of the current invention address one or more of the above-mentioned problems and provide a multistage press machine which presses features into a blank in successive stages to form features that are detailed and/or at different elevations. The multistage press machine includes spring-loaded components which press features into different sections of the blank in different stages, wherein features in a central section of the blank are pressed before features in outer sections of the blank. Since features in the outer sections of the blank are at a different elevation from features in the central section, embodiments of the multistage press machine allow for the features at a first elevation to be pressed and finished before the features at subsequent elevations.

One embodiment of the multistage press machine broadly comprises an upper plate assembly, a lower plate assembly, a top tool, and a bottom tool. The upper plate assembly is configured to couple to a system which lowers and raises the upper plate assembly. The lower plate assembly is configured to couple to the system to raise and lower the lower plate assembly. The top tool is attached to the upper plate assembly and configured to form a plurality of upper features in an upper surface of the blank, wherein each upper feature is formed in a respective one of a plurality of stages of a press operation. The bottom tool is attached to the lower plate assembly and configured to form a plurality of lower features in a lower surface of the blank, wherein each lower feature is formed in a respective one of the stages of the press operation.

One embodiment of the multistage press machine broadly comprises an upper plate assembly, a lower plate assembly, a top tool, and a bottom tool. The upper plate assembly is configured to couple to a system which lowers and raises the upper plate assembly. The lower plate assembly is configured to couple to the system to raise and lower the lower plate assembly. The top tool is attached to the upper plate assembly and is configured to form a plurality of upper features in an upper surface of the blank, wherein each upper feature is formed in a respective one of a plurality of stages of a press operation. The top tool includes at least one component having spring-loaded motion, and at least one component not having spring-loaded motion, such that the at least one component having spring-loaded motion is configured to form at least one upper feature during at least one stage of the press operation before the at least one component not having spring-loaded motion forms any upper features. The bottom tool is attached to the lower plate assembly and is configured to form a plurality of lower features in a lower surface of the blank, wherein each lower feature is formed in a respective one of the stages of the press operation. The bottom tool includes at least one component having spring-loaded motion, and at least one component not having spring-loaded motion, such that the at least one component having spring-loaded motion is configured to form at least one lower feature during at least one stage of the press operation before the at least one component not having spring-loaded motion forms any lower features.

Another embodiment of the multistage press machine forms a food storage container and broadly comprises an upper plate assembly, a lower plate assembly, a top tool, and a bottom tool. The upper plate assembly is configured to couple to a system which lowers and raises the upper plate assembly. The lower plate assembly is configured to couple to the system to raise and lower the lower plate assembly. The top tool is attached to the upper plate assembly and includes a male mold, a male mold ring insert, and a male mold central insert. The male mold is configured to form an inner radius surface of a curved upward wall of the food storage container and an upper surface of a flange of the food storage container. The male mold ring insert is configured to form an upper surface of an outer portion of a circular central wall of the food storage container. The male mold central insert is configured to form an upper surface of an inner portion of the circular central wall. The bottom tool is attached to the lower plate assembly and includes a female mold, a female mold ring insert, and a female mold central insert. The female mold is configured to form an outer radius surface of the curved upward wall and a lower surface of the flange. The female mold ring insert is configured to form a lower surface of the outer portion of the circular central wall. The female mold central insert is configured to form a lower surface of the inner portion of the circular central wall.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
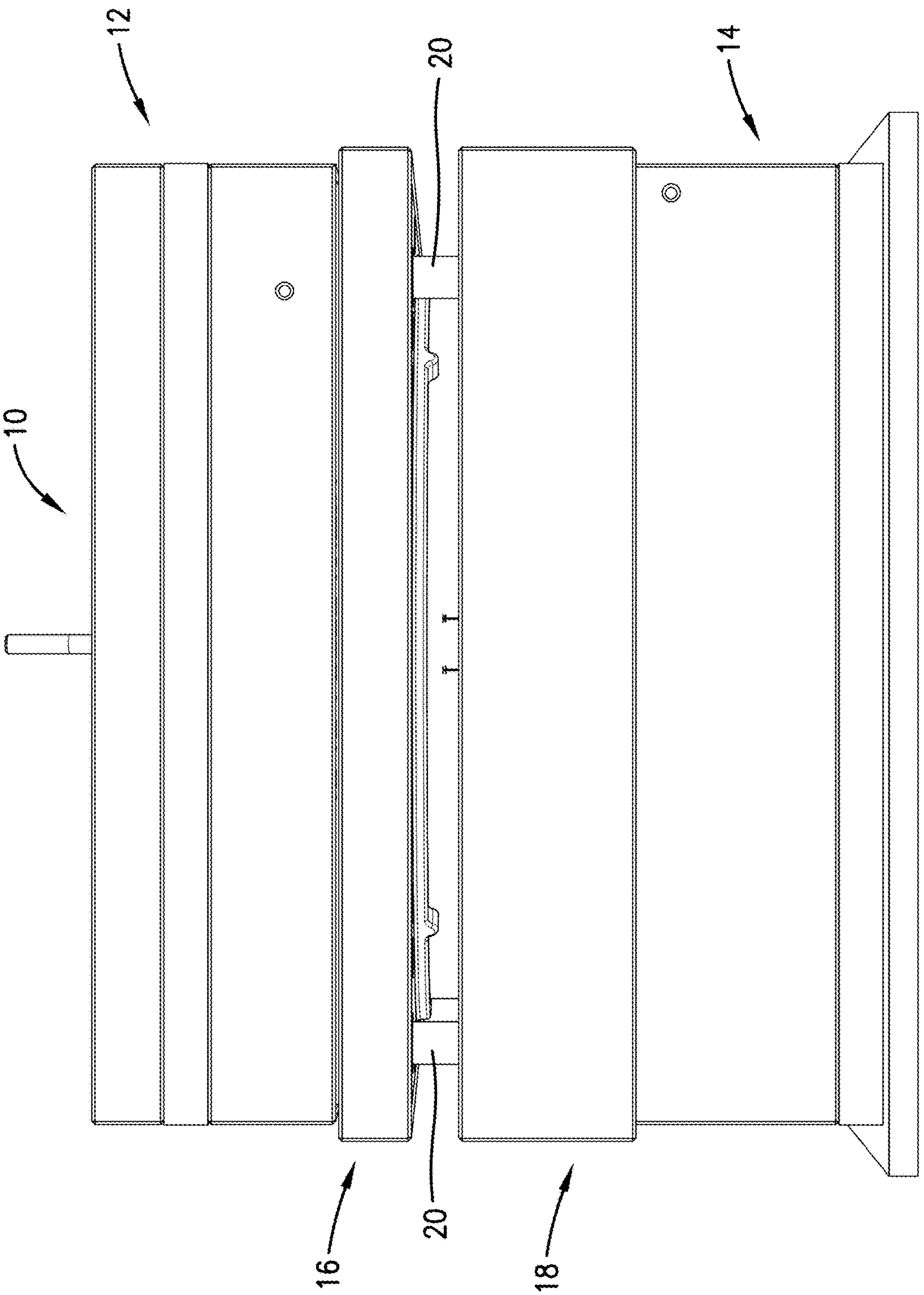
FIG. 1 is a front elevational view of a multistage press machine, constructed in accordance with various embodiments of the current invention and configured to press blanks into shaped parts, the multistage press machine including a top tool and a bottom tool.
Figure 2:
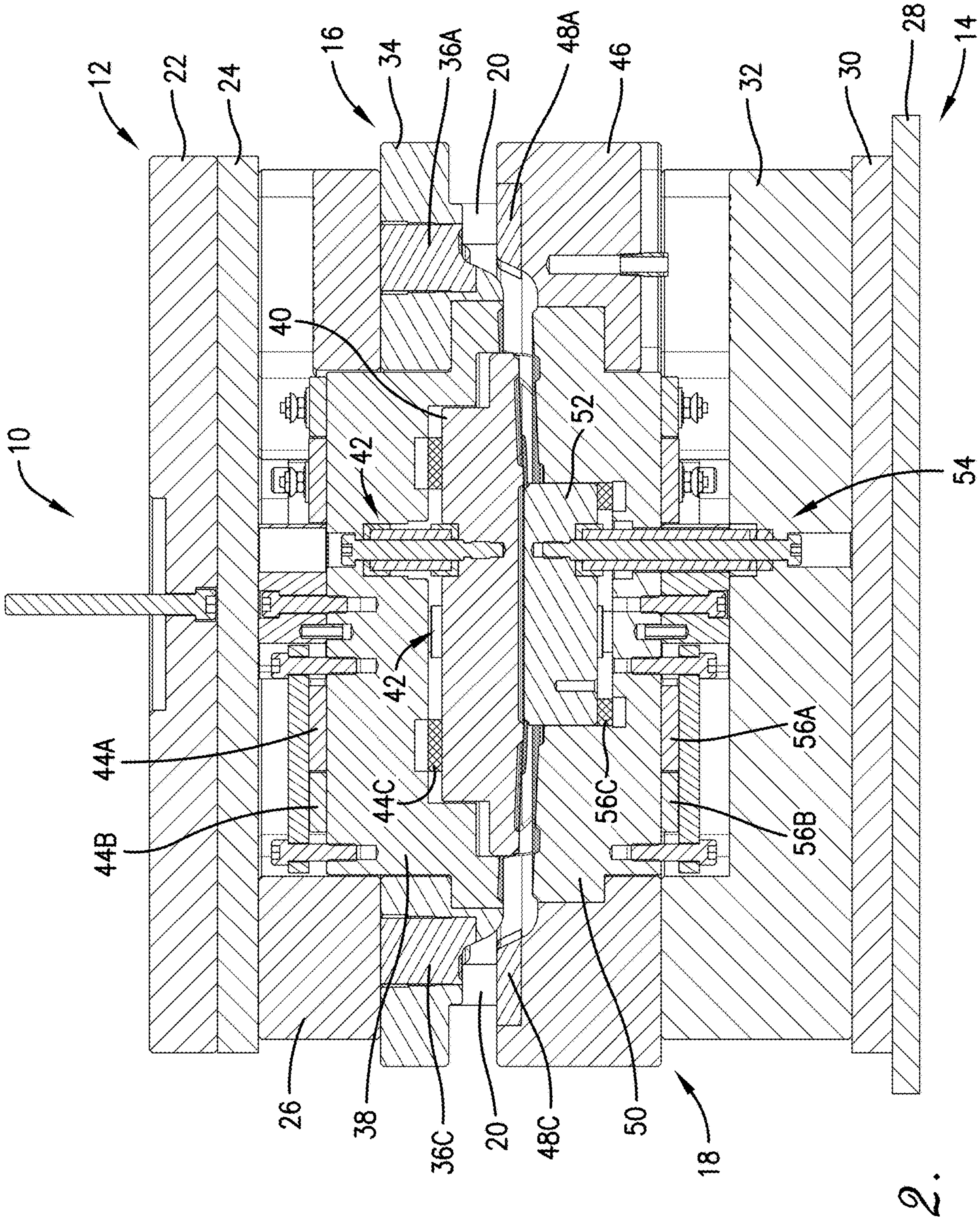
FIG. 2 is a front sectional view, cut along a vertical plane, of the multistage press machine.
Figure 3:
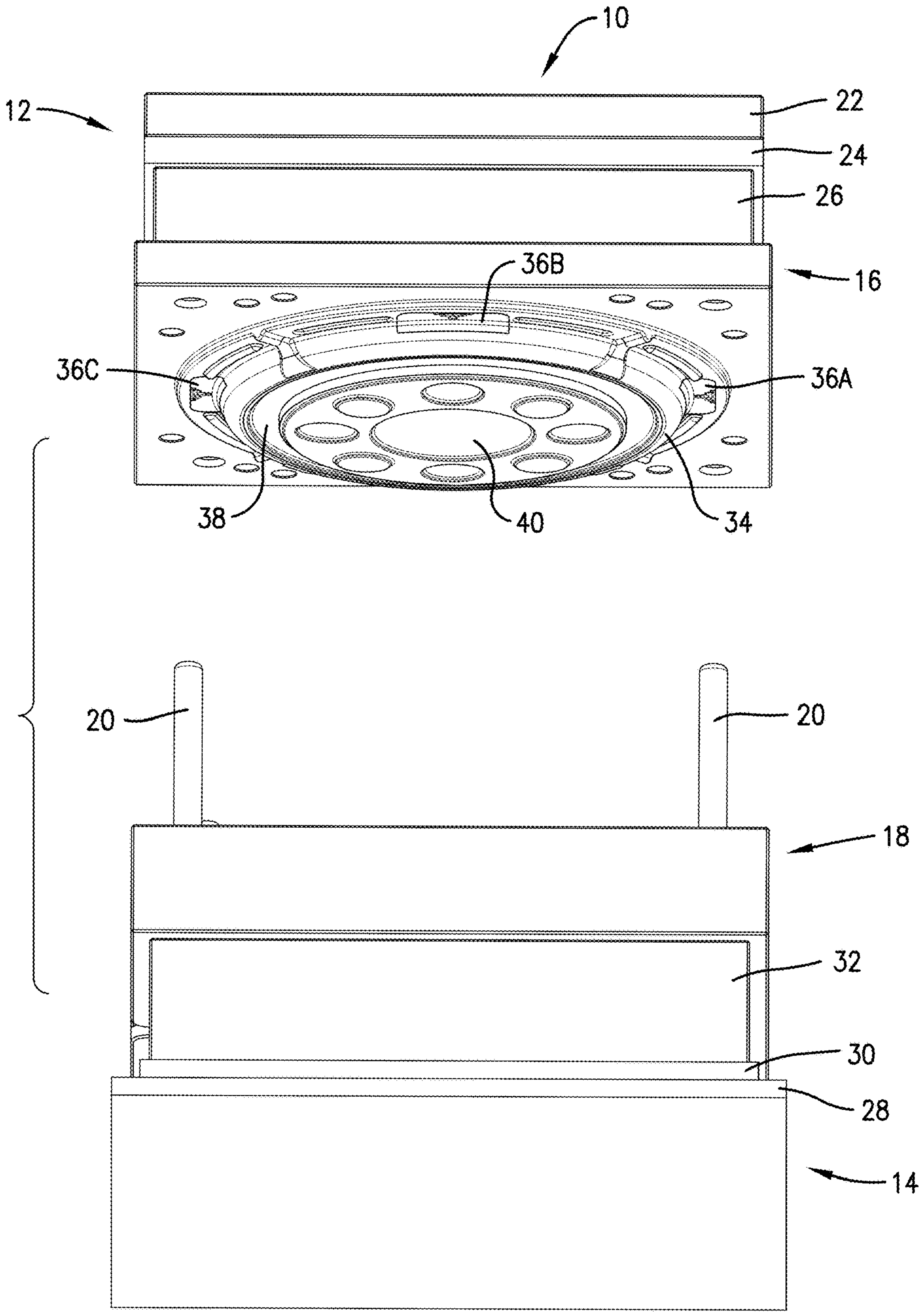
FIG. 3 is a front perspective view of the multistage press machine with the top tool separated from the bottom tool, illustrating a lower surface of the top tool.
Figure 4:
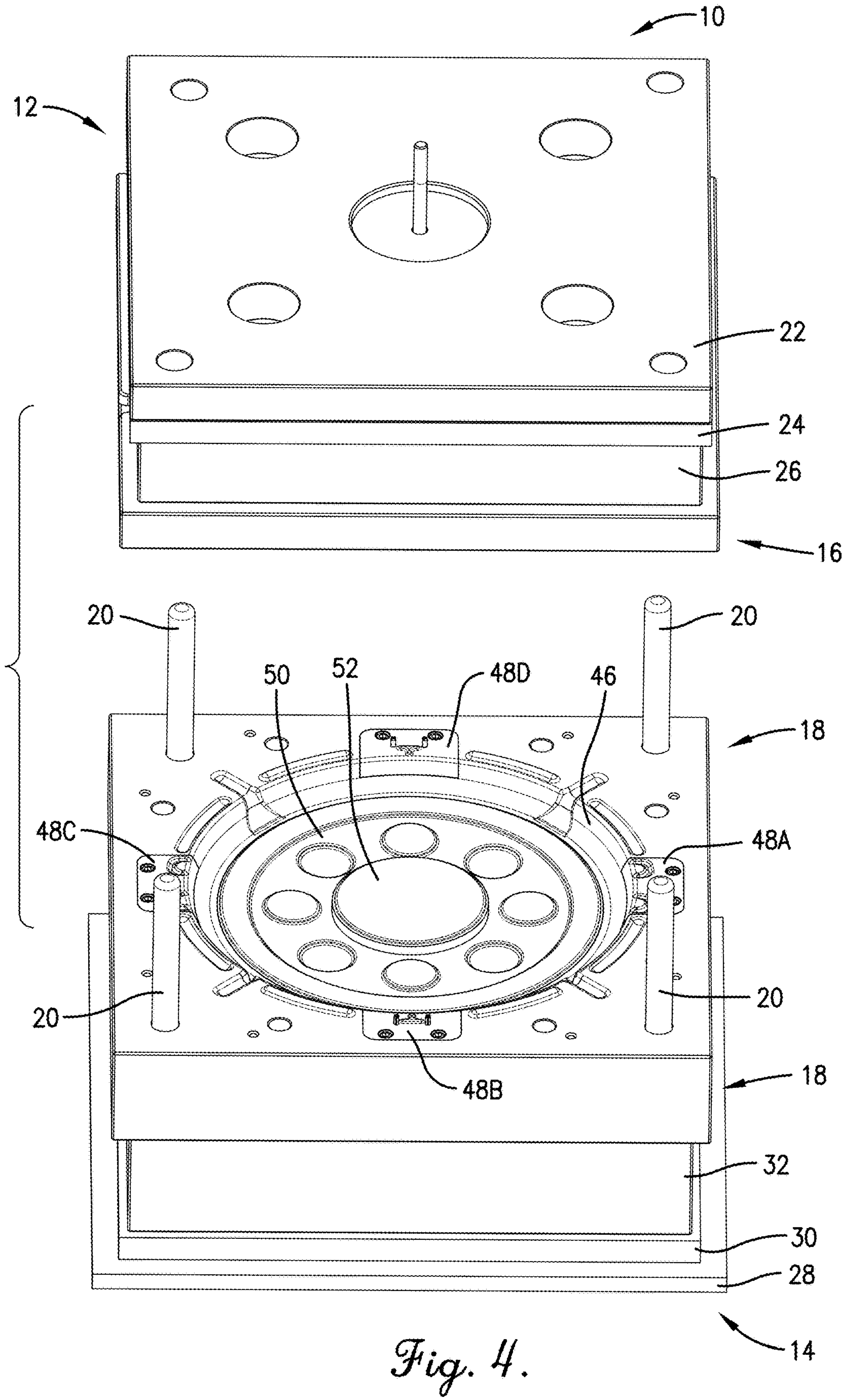
FIG. 4 is a front perspective view of the multistage press machine with the top tool separated from the bottom tool, illustrating an upper surface of the bottom tool.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "lower", "downward", "top", "bottom", "outer", "inner", "left", "right", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. However, embodiments of the technology in practice may be positioned and oriented in other ways or move in other directions. Therefore, the terms do not limit the scope of the current technology.

Figure 5:
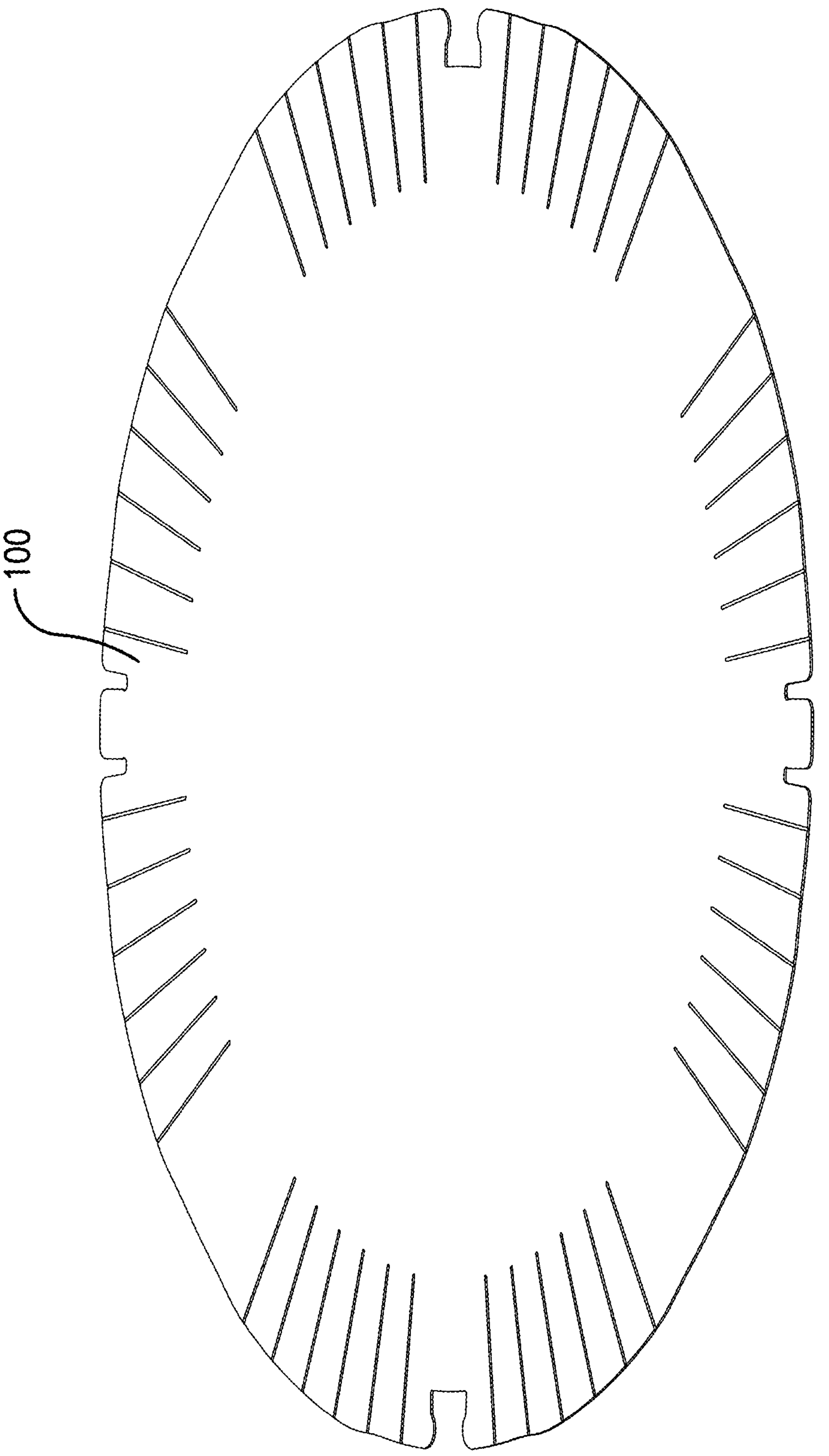
FIG. 5 is an upper perspective view of one of the blanks.

A multistage press machine 10, constructed in accordance with various embodiments of the current invention, is shown in FIGS. 1-4 and 6. The multistage press machine 10 is utilized to press blanks 100 into shaped parts 102 or products. That is, the multistage press machine 10 receives a stream of blanks 100 as an input, presses each blank 100, and outputs the processed blanks 100 as shaped parts 102. The multistage press machine 10 may be generally utilized to apply pressure, shape, score, fold, cut, and so forth. Each blank 100, as shown in FIG. 5, is a preformed, basic component which is typically cut, before being utilized in the current invention, into a near final shape of the part 102. For example, embodiments of the current invention may be utilized to press one of the blanks 100 into a top half or bottom half of a round pizza box. Thus, each blank 100 may already be cut into a circular, or near circular, shape having an upper surface and a lower surface, although other geometric shapes, such as triangular, quadrilateral, pentagon, etc., are possible. The blanks 100 utilized with exemplary embodiments of the current invention may be formed from paperboard material. The blanks 100 may also be formed from plastics or other materials which can be pressed, shaped, scored, folded, cut, and so forth. Exemplary parts 102 discussed herein and shown in FIGS. 7A and 7B include a part that functions as a top half and a bottom half of a pizza box. However, the multistage press machine 10 may also be used to produce other food containers such as containers for bakery items, deli items, meat or fish, take out food, and the like. Furthermore, the multistage press machine 10 may be used to produce containers used in storage and transportation for medical components, quick serve items, consumer products, horticultural items, construction projects, and so forth.

The multistage press machine 10 broadly comprises an upper plate assembly 12, a lower plate assembly 14, a top tool 16, and a bottom tool 18. In general, the top tool 16 may be swappable with other top tools and the bottom tool 18 may be swappable with other bottom tools, wherein the other tools may perform other functions. In addition, the multistage press machine 10 comprises at least four rod-shaped guide posts 20 which extend vertically from the bottom tool 18 to the top tool 16 to guide the motion of, at least, the upper plate assembly 12 and the top tool 16 during the press operation. The press operation may include multiple time-separated successive stages, such as a first stage, a second stage occurring after the first stage, and a third stage occurring after the second stage, as described in more detail below.

The upper plate assembly 12 retains the top tool 16 and couples to a hydraulic press (external to the current invention), which may raise and lower the upper plate assembly and the top tool 16. The upper plate assembly 12 includes a plurality of subcomponents, such as an adapter plate 22 which attaches to the hydraulic press, an upper insulator 24 which provides an insulating thermal barrier between the adapter plate 22 and the subcomponents of the top tool 16, and an upper riser 26 which provides additional support or spacing for the top tool 16.

The lower plate assembly 14 retains the bottom tool 18 and couples to the hydraulic press, upon which the lower plate assembly 14 may rest. The lower plate assembly 14 includes a plurality of subcomponents, such as an adapter support plate 28 which couples to and/or sits upon the hydraulic press, a lower insulator 30 which provides an insulating thermal barrier between the adapter support plate 28 and the subcomponents of the bottom tool 18, and a lower riser 32 which provides additional support or spacing for the bottom tool 18.

The top tool 16 contacts an upper surface of the blank 100 and applies pressure to the blank 100 in order to shape the upper surface of the blank 100. The top tool 16 has a generally convex shape with male features. The top tool 16 includes a plurality of subcomponents, such as a male mold 34, a plurality of male mold latch supports 36, a male mold ring insert 38, a male mold central insert 40, a plurality of upper spring-loaded connectors 42, and a plurality of upper heating elements 44.

The male mold 34 is attached to the upper riser 26 and includes a generally rectangular cuboid body having a central generally circular opening and a ring-shaped collar surrounding the central opening that extends downward from the body. The collar has a generally planar, vertical inner surface and a curved outer surface. The male mold 34 further includes a ring-shaped horizontal planar surface extending downward from the body. The horizontal planar surface is positioned radially outward from the collar and intersects the outer surface of the collar. The male mold 34 forms features on the upper surface of the blank 100 during the third stage of the press operation. The features include the inner radius surface of a curved upward wall of the part 102 (shown in FIGS. 7A and 7B) and indentations and bumps on the upper surface of the outer circumferential flange of the part 102.

Each male mold latch support 36 is attached to the upper riser 26 and has a generally rectangular cuboid body with rounded corners and opposing shoulders that extend outward from an upper portion of the body. Each male mold latch support 36 further includes a lower surface that has features to form a latch button on the upper surface of the blank 100, which becomes the flange of the part 102. The male mold latch supports 36 may be exchanged with other male mold latch supports that include other features for different configurations of the part 102. A first male mold latch support 36A is positioned in a first circumferential opening of the male mold 34, a second male mold latch support 36B is positioned in a second circumferential opening of the male mold 34, a third male mold latch support 36C is positioned in a third circumferential opening of the male mold 34, and a fourth male mold latch support (not shown in the figures) is positioned in a fourth circumferential opening of the male mold 34, wherein the circumferential openings in the male mold 34 are positioned along an edge of the collar spaced roughly 90 degrees apart.

The male mold ring insert 38 is attached to the upper riser 26 and has a two-level cylindrical shape with a circular top wall, a first cylindrical side wall attached to the top wall and having a first radius, and a second cylindrical side wall attached to a lower edge of the first side wall and having a second radius that is greater than the first radius. The top wall and the first side wall are positioned with the central opening of the male mold 34 such that the male mold ring insert 38 is concentric with the male mold 34. The first and second side walls form the outer boundaries of first and second male mold ring insert cavities, respectively. The second side wall includes a circumferential, annular lower surface positioned radially inward from the collar of the male mold 34 and which has features that are formed on the upper surface of the blank 100 to create an outer portion of a circular central wall of the part 102 during the third stage of the press operation.

The male mold central insert 40 is flexibly attached to the male mold ring insert 38 using the upper spring-loaded connectors 42 such that the male mold central insert 40 has spring-loaded motion. In addition, the male mold central insert 40 can translate or move telescopically up and down relative to the male mold ring insert 38. Furthermore, the male mold central insert 40 is positioned concentrically with the male mold ring insert 38 and the male mold 34. The male mold central insert 40 has a two-level cylindrical shape with a first solid cylinder having a first radius and a second solid cylinder attached to a lower surface of the first cylinder and having a second radius that is greater than the first radius. A circular lower surface of the second cylinder is positioned radially inward from the lower surface of the male mold ring insert 38 and includes a plurality of features, such as indentations and bumps (i.e., recessed areas and raised areas), which are formed on the upper surface of the blank 100 to create an inner portion of the circular central wall of the part 102 during the first and second stages of the press operation. With the urging of the upper spring-loaded connectors 42, the male mold central insert 40 extends downward from the male mold ring insert 38, so that the lower surface of (the second cylinder of) the male mold central insert 40 is below the lower surface of the male mold ring insert 38. When the spring force of the upper spring-loaded connectors 42 is overcome, the male mold central insert 40 retracts upward into the male mold ring insert 38, so that the lower surface of (the second cylinder of) the male mold central insert 40 is approximately at the same level as the lower surface of the male mold ring insert 38.

Each upper spring-loaded connector 42 includes a rod-shaped bolt, a spring, and one or more spring cup washers. The bolt has a first end fixedly attached to the male mold central insert 40 and a second end slidably positioned in one of a plurality of openings in the male mold ring insert 38. The spring is a coil spring with a radius which is greater than a radius of the bolt and coaxially positioned to encircle to the bolt. The spring of each upper spring-loaded connector 42 has a first spring force (according to Hooke's Law: $f=-kx$). Each spring cup washer has a radius greater than the radius of the spring and is coaxially positioned to encircle at least a portion of the spring. Exemplary embodiments of the top tool 16 include nine upper spring-loaded connectors 42, although a larger number or a smaller number of upper spring-loaded connectors 42 could be utilized.

Each upper heating element 44 is ring or annular shaped and is formed from electrically conductive material through which an electric current flows in order to generate heat (thermal energy). The upper heating elements 44 are positioned on an upper surface of the male mold ring insert 38 to provide heat to the male mold ring insert 38. A first upper heating element 44A has an outer radius that is less than an inner radius of a second upper heating element 44B such that the first upper heating element 44A is coaxially positioned within the second upper heating element 44B.

In various embodiments, the upper heating elements 44 also include heating elements coupled to and/or embedded within the male mold central insert 40. For example, at least a third upper heating element 44C is positioned on an upper surface of the male mold central insert 40. Instead, or in addition, additional upper heating elements 44 may be embedded within the male mold central insert 40 and may have one of a variety of shapes, such as annular, cylindrical, cuboid, and the like.

The bottom tool 18 contacts a lower surface of the blank 100 and applies pressure to the blank 100 in order to shape the lower surface of the blank 100. The bottom tool 18 has a generally concave shape with female features. The bottom tool 18 includes a plurality of subcomponents, such as a female mold 46, a plurality of female mold latch supports 48, a female mold ring insert 50, a female mold central insert 52, a plurality of lower spring-loaded connectors 54, and a plurality of lower heating elements 56.

The female mold 46 is attached to the lower riser 32 and includes a generally rectangular cuboid body having a two-level cylindrical cavity creating a central opening in the body. A first female mold cavity is inset in a lower surface of the body and has a first radius. A second female mold cavity is positioned above the first female mold cavity and has a second radius which is greater than the first radius. In addition, the body includes a third female mold cavity positioned above the second female mold cavity and having a circumferential side wall with an arcuate cross-sectional inner shape. The circumferential side wall aligns with the collar of the male mold 34. The female mold 46 further includes a horizontal planar surface positioned radially outward from the side wall. The female mold 46 forms features on the lower surface of the blank 100 during the third stage of the press operation. The features include the outer radius surface of the curved upward wall of the part

102 and bumps and indentations on the lower surface of the outer circumferential flange of the part 102.

Each female mold latch support 48 has a generally rectangular cuboid body with rounded corners. Each female mold latch support 48 is attached to the female mold 46, with a first female mold latch support 48A positioned in a first circumferential opening in the female mold 46, a second female mold latch support 48B positioned in a second circumferential opening in the female mold 46, a third female mold latch support 48C positioned in a third circumferential opening in the female mold 46, and a fourth female mold latch support 48D positioned in a fourth circumferential opening in the female mold 46. Each female mold latch support 48 further includes an upper surface that has features to form a latch button on the lower surface of the blank 100.

The female mold ring insert 50 is attached to the lower riser 32 and is positioned within the first female mold cavity and the second female mold cavity such that the female mold ring insert 50 is concentric with the female mold 46. The female mold ring insert 50 has a two-level shape with a circular bottom wall and a first annular disc attached to an upper surface of the bottom wall. An inner surface of the first annular disc forms the outer boundary of a first female mold ring insert cavity. The first annular disc includes an upper surface which has a plurality of features, such as indentations and bumps (i.e., recessed areas and raised areas), which are complementary to features on the lower surface of the male mold central insert 40 and are formed on the lower surface of the blank 100 during the second and third stages of the press operation.

The female mold central insert 52 is flexibly attached to the female mold ring insert 50 and the lower riser 32 using the lower spring-loaded connectors 54 such that the female mold central insert 52 has spring-loaded motion. In addition, the female mold central insert 52 can translate or move telescopically up and down relative to the female mold ring insert 50. Furthermore, the female mold central insert 52 is positioned concentrically with the female mold ring insert 50 and the female mold 46. The female mold central insert 52 is positioned within the first female mold ring insert cavity and has a generally cylindrical shape with an upper surface, a lower surface, and a circumferential side surface. With the urging of the lower spring-loaded connectors 54, the female mold central insert 52 extends upward from the female mold ring insert 50, so that the upper surface of the female mold central insert 52 is above the upper surface of the female mold ring insert 50. When the spring force of the lower spring-loaded connectors 54 is overcome, the female mold central insert 52 retracts downward into the female mold ring insert 50, so that the upper surface of the female mold central insert 52 is approximately at the same level as the upper surface of the female mold ring insert 50. The upper surface of the female mold central insert 52 may include features that are formed on the lower surface of the blank 100 during the first stage of the press operation.

Each lower spring-loaded connector 54 is similar in construction to one of the upper spring-loaded connectors 42 and includes a rod-shaped bolt, a spring, and one or more spring cup washers. The bolt has a first end fixedly attached to the female mold central insert 52, a second end slidably positioned in one of a plurality of openings in the lower riser 32, and a middle portion slidably positioned in one of a plurality of openings in the female mold ring insert 50. The spring is a coil spring with a radius which is greater than a radius of the bolt and coaxially positioned to encircle to the bolt. The spring of each lower spring-loaded connector 54 has a second spring force which is less than the first spring force (of the spring of each upper spring-loaded connector 42). Each spring cup washer has a radius greater than the radius of the spring and is coaxially positioned to encircle at least a portion of the spring. Exemplary embodiments of the bottom tool 18 include three lower spring-loaded connectors 54, although a larger number or a smaller number of lower spring-loaded connectors 54 could be utilized.

Each lower heating element 56 is ring or annular shaped and is formed from electrically conductive material through which an electric current flows in order to generate heat. The lower heating elements 56 are positioned on a lower surface of the female mold ring insert 50 to provide heat to the female mold ring insert 50. A first lower heating element 56A has an outer radius that is less than an inner radius of a second lower heating element 56B such that the first lower heating element 56A is coaxially positioned within the second lower heating element 56B.

In various embodiments, the lower heating elements 56 also include heating elements coupled to and/or embedded within the female mold central insert 52. For example, at least a third lower heating element 56C is positioned on a lower surface of the female mold central insert 52. Instead, or in addition, additional lower heating elements 56 may be embedded within the female mold central insert 52 and may have one of a variety of shapes, such as annular, cylindrical, cuboid, and the like.

Figure 6:
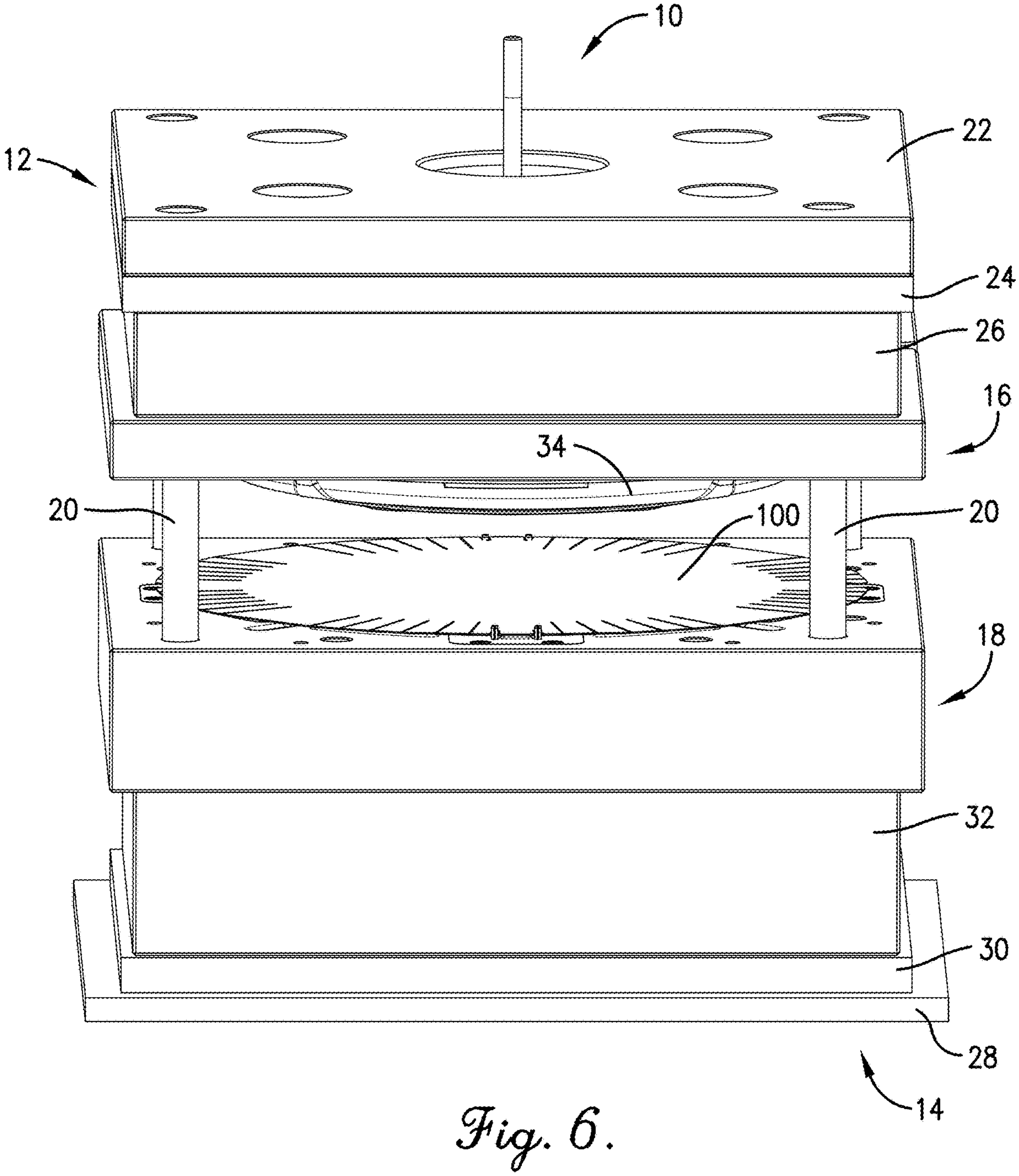
FIG. 6 is a front perspective view of the multistage press machine with the top tool separated from the bottom tool, illustrating the blank before it is pressed and shaped.

Referring to FIGS. 2, 5, 6, 7A, and 7B, the press operation and formation of the part 102 may occur as follows. The top tool 16 and the bottom tool 18 are spaced apart from one another, as shown in FIG. 6. The upper heating elements 44 and the lower heating element 56 may be activated to heat the male mold ring insert 38 and the female mold ring insert 50, respectively. Additional upper heating elements 44 may be activated to heat the male mold central insert 40, and additional lower heating elements 56 may be activated to heat the female mold central insert 52. One of the blanks 100 is positioned on the bottom tool 18 by external (to the current invention) system components such as conveyors or the like. The outer circumferential edge of the lower surface of the blank 100 rests on a rim of the third female mold cavity and a portion of an upper surface of the body of the female mold 46, as well as the upper surfaces of the female mold latch supports 48. The hydraulic press (to which the upper plate assembly 12 and the lower plate assembly 14 are attached) closes in one single fluid motion, which lowers the upper plate assembly 12 and the top tool 16, raises the lower plate assembly 14 and the bottom tool 18, or both.

The first stage of the press operation begins as the top tool 16 and the bottom tool 18 converge, the lower surface of the male mold central insert 40 contacts the upper surface of the center of the blank 100. As the hydraulic press continues to close, the male mold central insert 40 applies downward pressure to the central portion of the blank 100 until the lower surface of the blank 100 contacts the upper surface of the female mold central insert 52. With the top tool 16 pushing downward, the bottom tool 18 pushing upward, or both, the central portion of the blank 100 is compressed between the male mold central insert 40 and the female mold central insert 52 so that a first upper feature 104U and a first lower feature 104L of the part 102 are formed in the center of the part 102. In some embodiments, the first upper feature 104U is complementary to the first lower feature 104L, and the two features 104U, 104L are formed in combination with one another. An exemplary first upper feature 104U and first lower feature 104L include a central circular feature having a bump on the upper surface of the part 102 and a complementary indentation on the lower surface. The first upper feature 104U and the first lower feature 104L in combination form a first portion of a central circular wall of the part 102. In other embodiments, the first upper feature 104U may not be complementary to the first lower feature 104L. Applying heat to the male mold central insert 40 and the female mold central insert 52 may help to form the features 104U, 104L, smooth out wrinkles in the blank 100, and provide a more uniform surface on the part 102. Given that the spring force of the spring of each upper spring-loaded connector 42 is greater than the spring force of the spring of each lower spring-loaded connector 54, as the hydraulic press continues to close, the male mold central insert 40 pushes the female mold central insert 52 downward so that the female mold central insert 52 retracts into the female mold ring insert 50. At its lowest point of travel, the upper surface of the female mold central insert 52 is only a small distance above the upper surface of the female mold ring insert 50.

As the female mold central insert 52 retracts into the female mold ring insert 50, the first stage of the press operation ends, and the second stage of the press operation begins. That is, an intermediate portion of the blank 100 gets compressed by an outer portion of the male mold central insert 40 and an inner portion of the female mold ring insert 50 so that a second upper feature 106U and a second lower feature 106L of the part 102 are formed—adjacent to, and radially outward from, the first upper feature 104U and the first lower feature 104L, respectively. An exemplary second upper feature 106U includes a plurality of features, such as indentations and bumps (i.e., recessed areas and raised areas). An exemplary second lower feature 106L includes a plurality of features, such as indentations and bumps. An indentation on the upper surface of the part 102 corresponds to a complementary bump on the lower surface of the part 102 and vice versa. The second upper feature 106U and the second lower feature 106L in combination form a second portion of the central circular wall of the part 102. Applying heat to the male mold central insert 40 and the female mold ring insert 50 may help to form the features 106U, 106L, smooth out wrinkles in the blank 100, and provide a more uniform surface on the part 102.

When the outer portion of the male mold central insert 40 fully presses (through the blank 100) into the inner portion of the female mold ring insert 50, the male mold central insert 40 starts to retract into the male mold ring insert 38. The second stage of the press operation ends, and the third stage of the press operation begins. As the male mold central insert 40 continues to retract, the male mold ring insert 38 and the collar of the male mold 34 move toward the outer portion of the female mold ring insert 50 and the third cavity of the female mold 46. When the male mold central insert 40 retracts as far as it can, an outer circumferential portion of the blank 100 is compressed between lower surfaces of the male mold ring insert 38, the male mold 34, and the male mold latch supports 36, and upper surfaces of the female mold ring insert 50, the female mold 46, and the female mold latch supports 48. At this time, a third upper feature 108U and a third lower feature 108L of the part 102 are formed—adjacent to, and radially outward from, the second upper feature 106U and the second lower feature 106L, respectively. An exemplary third upper feature 108U and an exemplary complementary third lower feature 108L include, in a radially outward direction, a flat portion (which is a third portion of the circular central wall of the part 102) formed between the male mold ring insert 38 and the female mold ring insert 50, a portion that is curved upward (with an arcuate cross section and creating a curved upward wall on the part 102) formed between the collar of the male mold 34 and the side wall of the third cavity of the female mold 46, and a planar portion (which is an outer circumferential flange on the part 102) formed between the horizontal planar surface of the male mold 34 and the horizontal planar surface of the female mold 46. The flange includes a plurality of depressed or recessed features, as well as a plurality of latching features that are formed by the male mold latch supports 36 and the female mold latch supports 48.

Figure 7A:
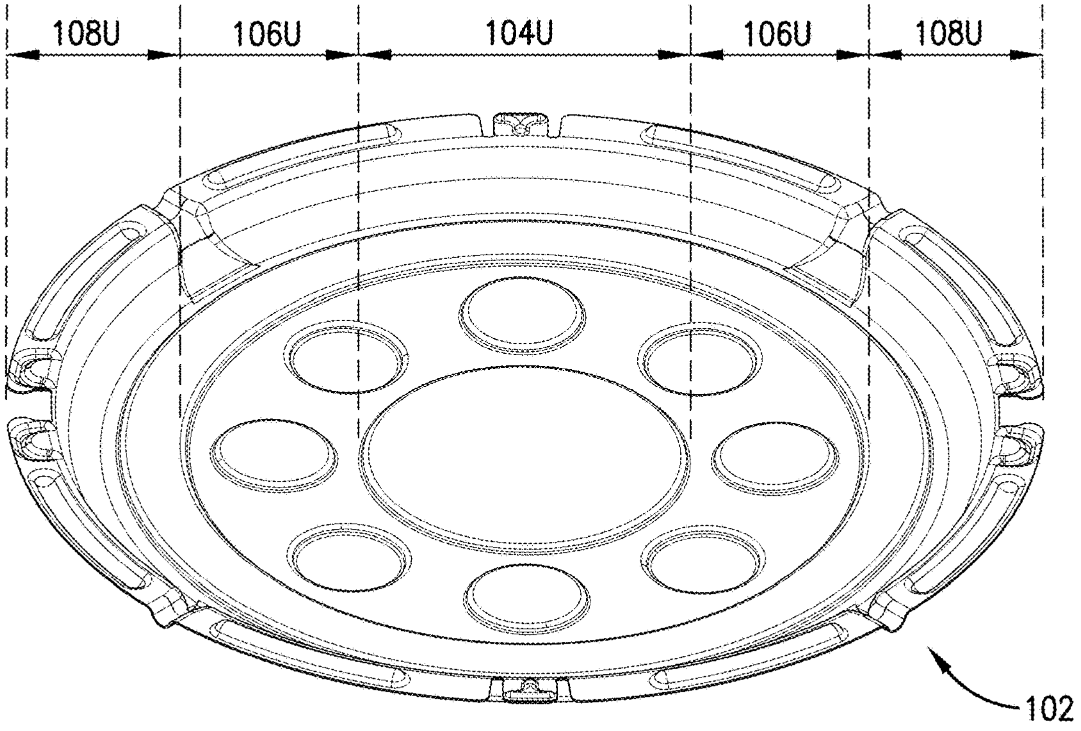
FIG. 7A is an upper perspective view of one of the parts.
Figure 7B:
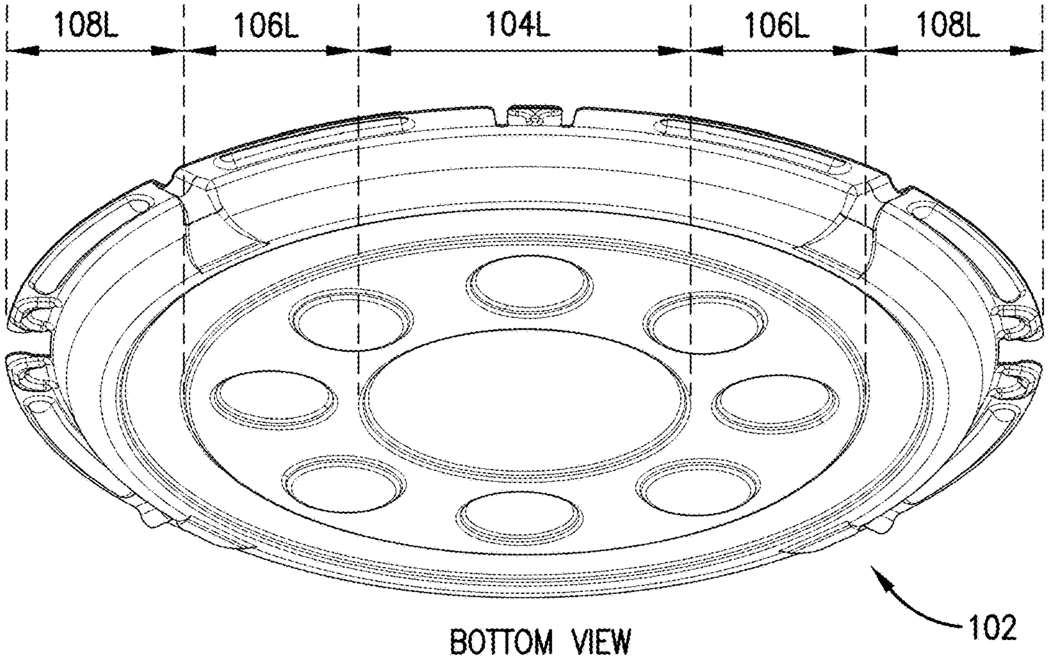
FIG. 7B is a lower perspective view of one of the parts.

After the third upper feature 108U and the third lower feature 108L are formed, the press operation is complete, and the part 102 is finished. The hydraulic press opens, with the upper plate assembly 12 and the top tool 16 being raised, the lower plate assembly 14 and the bottom tool 18 being lowered, or both. The part 102, as shown in FIGS. 7A and 7B, is removed. Another blank 100 is placed on the bottom tool 18, and the press operation repeats.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A multistage press machine for forming a food storage container, the multistage press machine comprising:
- an upper plate assembly configured to couple to a system which lowers and raises the upper plate assembly;
- a lower plate assembly configured to couple to the system to raise and lower the lower plate assembly;
- a top tool attached to the upper plate assembly and including:
  - a male mold configured to form an inner radius surface of a curved upward wall of the food storage container and an upper surface of a flange of the food storage container,
  - a male mold ring insert configured to form an upper surface of an outer portion of a circular central wall of the food storage container, and
  - a male mold central insert configured to form an upper surface of an inner portion of the circular central wall; and
- a bottom tool attached to the lower plate assembly and including:
  - a female mold configured to form an outer radius surface of the curved upward wall and a lower surface of the flange,
  - a female mold ring insert configured to form a lower surface of the outer portion of the circular central wall, and
  - a female mold central insert configured to form a lower surface of the inner portion of the circular central wall.

2. The multistage press machine of claim 1, wherein
- the male mold includes a central opening, a ring-shaped collar extending downward and surrounding the opening, and a horizontal planar surface positioned radially outward from the collar,
- the male mold ring insert is partially positioned within the central opening of the male mold, the male mold ring insert including a cavity and a circumferential, annular first lower surface positioned radially inward from the collar, and
- the male mold central insert is positioned within the cavity of the male mold ring insert, the male mold central insert including a circular second lower surface positioned radially inward from the first lower surface.

3. The multistage press machine of claim 2, wherein the male mold central insert extends from and retracts into the male mold ring insert.

4. The multistage press machine of claim 3, wherein the top tool further includes a plurality of upper spring-loaded connectors connecting the male mold central insert to the male mold ring insert and urging the male mold central insert to extend from the male mold ring insert.

5. The multistage press machine of claim 2, wherein the top tool further includes a plurality of male mold latch supports configured to form latch features on the upper surface of the flange, each male mold latch support positioned in a respective one of a plurality of circumferential openings in the male mold.

6. The multistage press machine of claim 2, wherein
- the female mold includes a central opening, a circumferential side wall having an arcuate cross-sectional inner shape positioned in alignment with the collar of the male mold, and a horizontal planar surface positioned radially outward from the side wall,
- the female mold ring insert is positioned within the central opening of the female mold, the female mold ring insert including a cavity and an annular disc positioned radially inward from the side wall and having a first upper surface, and
- the female mold central insert is positioned within the cavity of the female mold ring insert, the female mold central insert including a circular second upper surface positioned radially inward from the first upper surface.

7. The multistage press machine of claim 6, wherein the female mold central insert extends from and retracts into the female mold ring insert.

8. The multistage press machine of claim 7, wherein the bottom tool further includes a plurality of lower spring-loaded connectors connecting the female mold central insert to the lower plate assembly and urging the female mold central insert to extend from the female mold ring insert.

9. The multistage press machine of claim 6, wherein the bottom tool further includes a plurality of female mold latch supports configured to form latch features on the lower surface of the flange, each female mold latch support positioned in a respective one of a plurality of circumferential openings in the female mold.

10. The multistage press machine of claim 1, further comprising:
- an upper heating element coupled to the male mold ring insert or the male mold central insert, the upper heating element configured to provide heat to the upper surface of the food storage container; and
- a lower heating element coupled to the female mold ring insert or the female mold central insert, the lower heating element configured to provide heat to the lower surface of the food storage container.

* * * * *